(12) United States Patent
Gnabah et al.

(10) Patent No.: US 11,942,848 B2
(45) Date of Patent: Mar. 26, 2024

(54) COMPACT BUSBAR ASSEMBLY

(71) Applicant: Schaeffler Technologies AG & Co. KG, Herzogenaurach (DE)

(72) Inventors: Zachary Gnabah, Canton, OH (US); Michael Conner, Uniontown, OH (US); Jeremy Vanni, Medina, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 542 days.

(21) Appl. No.: 17/152,112

(22) Filed: Jan. 19, 2021

(65) Prior Publication Data
US 2022/0231562 A1 Jul. 21, 2022

(51) Int. Cl.
*H02K 3/00* (2006.01)
*H01R 11/01* (2006.01)
*H02K 3/52* (2006.01)
*H02K 11/00* (2016.01)

(52) U.S. Cl.
CPC ............. *H02K 3/522* (2013.01); *H01R 11/01* (2013.01); *H02K 2203/09* (2013.01)

(58) Field of Classification Search
CPC ....... H01R 11/01; H01R 13/405; H01R 43/24
See application file for complete search history.

(56) References Cited

U.S. PATENT DOCUMENTS

| 9,705,300 | B1* | 7/2017 | Maurer | H02G 5/007 |
| 2014/0183993 | A1* | 7/2014 | Takasaki | H02K 15/0062 |
| | | | | 310/71 |
| 2015/0097453 | A1* | 4/2015 | Nishikawa | H02K 3/50 |
| | | | | 310/71 |
| 2017/0005535 | A1* | 1/2017 | Gervais | H02K 3/18 |
| 2017/0033630 | A1* | 2/2017 | Tamura | H02K 3/18 |
| 2019/0157934 | A1* | 5/2019 | Kawaguchi | H02K 3/50 |
| 2023/0187889 | A1* | 6/2023 | Sizemore | B29C 45/0013 |
| | | | | 439/736 |

FOREIGN PATENT DOCUMENTS

| CN | 210200991 | 3/2020 | |
| WO | 2015/172599 A1 | 11/2015 | |
| WO | WO-2015172599 A1 * | 11/2015 | ............... H02K 3/50 |

OTHER PUBLICATIONS

Website: Wieland Worldwide, "Components for eMobility" Retrieved from http://www.wieland.com/en/components-for-emobility#highvoltagecomponents on Jan. 4, 2021 (Published Sep. 2020).

* cited by examiner

*Primary Examiner* — Abdullah A Riyami
*Assistant Examiner* — Thang H Nguyen
(74) *Attorney, Agent, or Firm* — Volpe Koenig

(57) ABSTRACT

A busbar assembly is disclosed that includes a carrier, and a plurality of conductors arranged within the carrier such that at least a portion of each of the plurality of conductors are exposed in a radial direction and define electrical contact sites. The carrier can be formed by molding the carrier about the plurality of conductors.

18 Claims, 9 Drawing Sheets

COMPACT BUSBAR ASSEMBLY

FIELD OF INVENTION

The present disclosure relates to a busbar assembly.

BACKGROUND

Electric motors generally include a stator, rotor, and other components. One such component is a busbar or contact carrier, which provides an electrical interface with a stator. Based on the varying shapes and sizes of electric motors, busbars can take on a variety of shapes, sizes, and configurations.

There is a general desire to provide more efficient electric motor designs as well as a desire to provide compact designs, which are relatively uncomplicated to manufacture and cost effective.

SUMMARY

A busbar assembly is disclosed that includes a carrier, and a plurality of conductors arranged within the carrier such that at least a portion of each of the plurality of conductors are exposed in a radial direction and define electrical contact sites. The carrier can be formed by molding the carrier about the plurality of conductors.

The conductors can include a first phase conductor, a second phase conductor, a third phase conductor, and a neutral conductor. The first conductor and the second conductor can be arranged in a first axial plane that extends perpendicular to an axis of the carrier, and the third conductor and the neutral conductor can be arranged in a second axial plane that extends perpendicular to the axis of the carrier.

The first phase conductor, the second phase conductor, the third phase conductor, and the neutral conductor each define a predetermined quantity of electrical contact sites, and the neutral conductor has more electrical contact sites than the other conductors.

In one embodiment, the neutral conductor is arranged such that the contacts of the neutral conductor are defined on a radially inner side of the carrier.

The carrier can include a plurality of retainers each dimensioned or configured to hold an electrical wire. The retainers are arranged along at least one of a radially inner surface or a radially outer surface of the carrier. The retainers include a first set of retainers defining slots oriented in a radial direction and a second set of retainers defining slots oriented in a circumferential direction.

The of conductors each have a square profile in one aspect.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
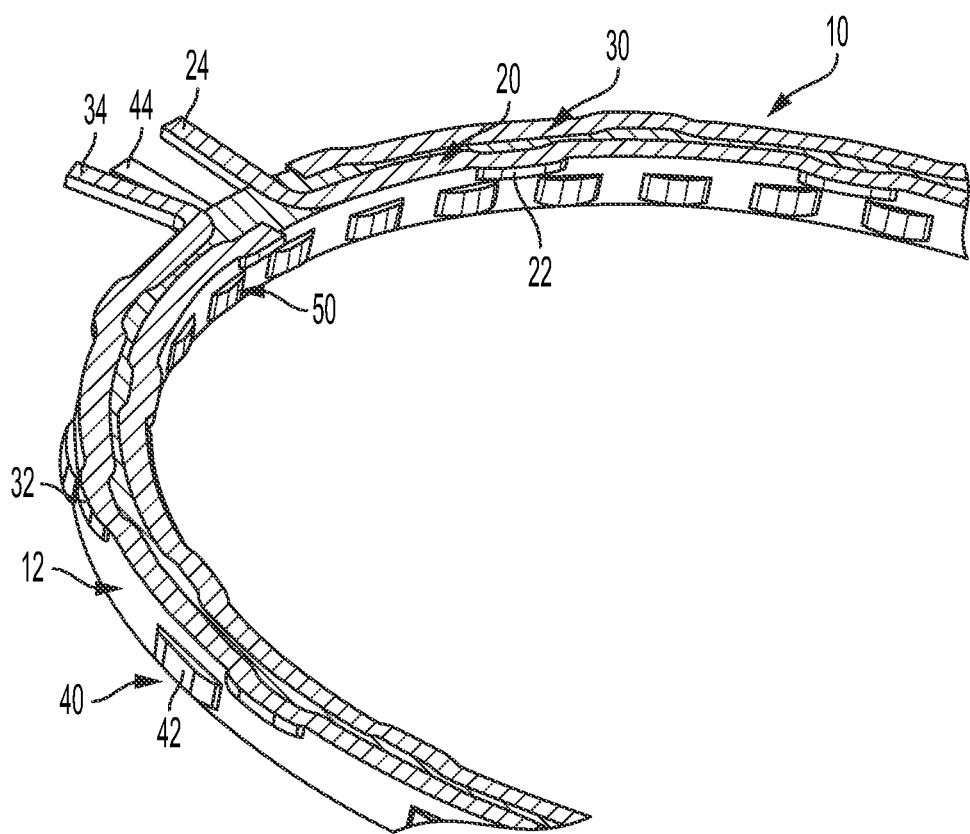
FIG. 1 is a perspective view of a busbar assembly through a cross-section of the busbar assembly according to one aspect.

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in the Figures, a busbar assembly 10 is disclosed. The busbar assembly generally includes a carrier 12 and a plurality of conductors 20, 30, 40, 50 arranged within the carrier 12.

The carrier 12, which is also known as an insulator body, is formed around each of the plurality of conductors 20, 30, 40, 50 such that at least a portion of each of the plurality of conductors 20, 30, 40, 50 are exposed (i.e. not completely encapsulated). The carrier 12 can be molded, i.e. overmolded, around the conductors or otherwise formed such that the carrier 12 envelopes or covers a majority of the conductors. In another aspect, an insulating body or carrier can be formed as a tray style configuration in which the carrier is formed or manufactured separately prior to the addition or joining of any conductors. The conductors can be placed or arranged inside of channels defined by the already formed carrier. Exposed portions of the conductors 20, 30, 40, 50 define electrical contact sites 22, 32, 42, 52, also known as contact pads. In one aspect, the configuration is asymmetrical because no additional phase terminals need to be added to the conductors 20, 30, 40, 50. As used herein, the term asymmetrical with respect to the configurations means that the incoming current arrived to the conductors at the terminals (i.e. the locations indicated by reference numerals 24, 34, and 44) and travels the full length of the conductor to reach the final contact site. In contrast, a symmetrical arrangement requires that the incoming current and contact sites are split equally on either side of the terminal site. Thus, in a symmetrical arrangement, there is a symmetric amount of current provided to a symmetric quantity of windings on either side of the terminal location.

Figure 4:
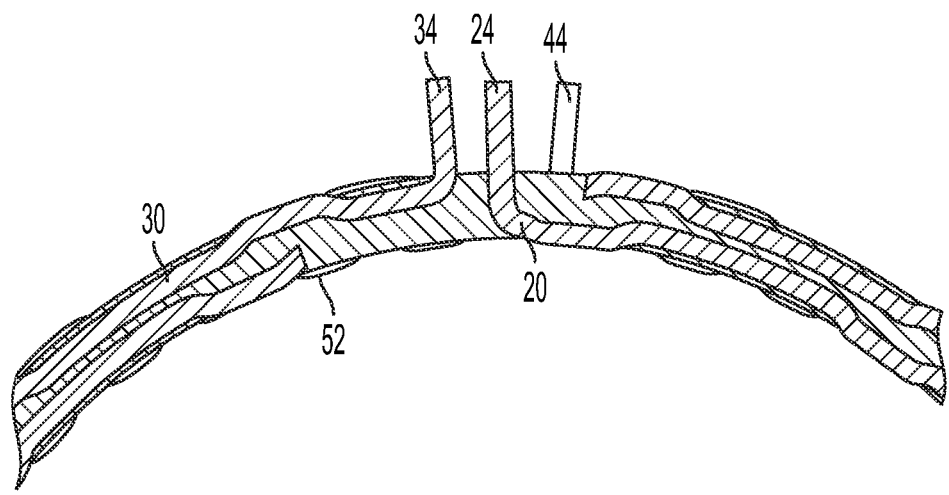
FIG. 4 is a front cross-sectional view of the busbar assembly of FIG. 1.

As shown in FIG. 4, the electrical contact sites 22, 32, 42, 52 can be formed by slight variations in either a radially outward or radially inward direction such that portions of the conductors 20, 30, 40, 50 are bent or deviate from a generally circular profile to define the electrical contact sites 22, 32, 42, 52.

In one aspect, the plurality of conductors includes a first phase conductor 20, a second phase conductor 30, a third phase conductor 40, and a neutral conductor 50. For example, the three phases can correspond to the U, V, and W phases. One of ordinary skill in the art would recognize based on the present disclosure that the number of phases and configuration of conductors can vary.

In one aspect, the conductors 20, 30, 40, 50 each have a square profile when viewed in the circumferential direction. One of ordinary skill in the art would understand that the shape of the conductors 20, 30, 40, 50 can vary and can be circular or any other shape.

Figure 5:
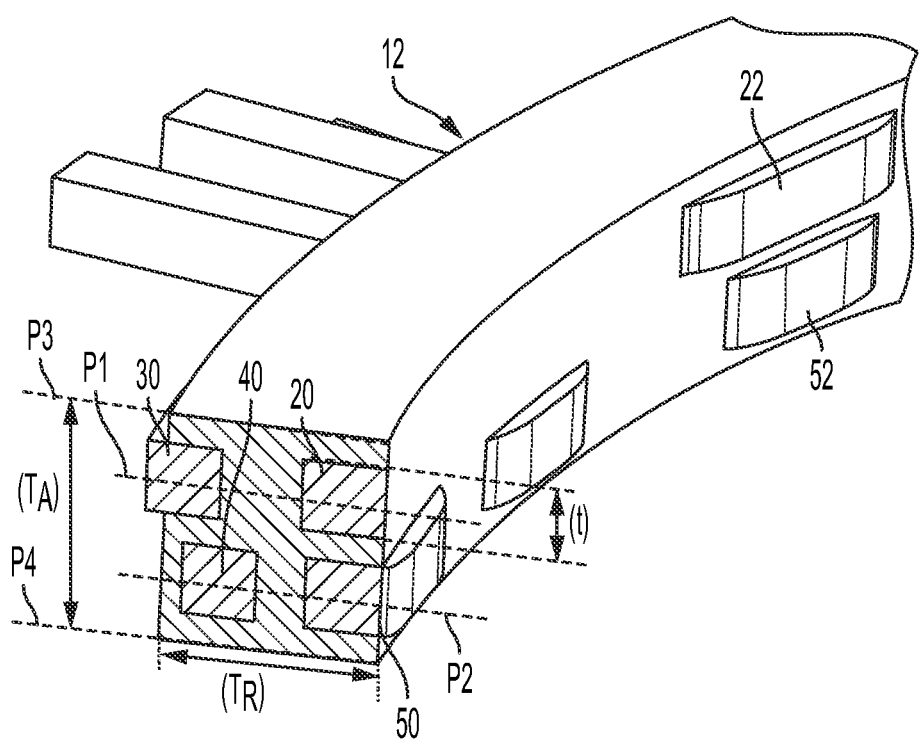
FIG. 5 is a side cross-sectional view of the busbar assembly of FIG. 1 from an elevated perspective.
Figure 6:
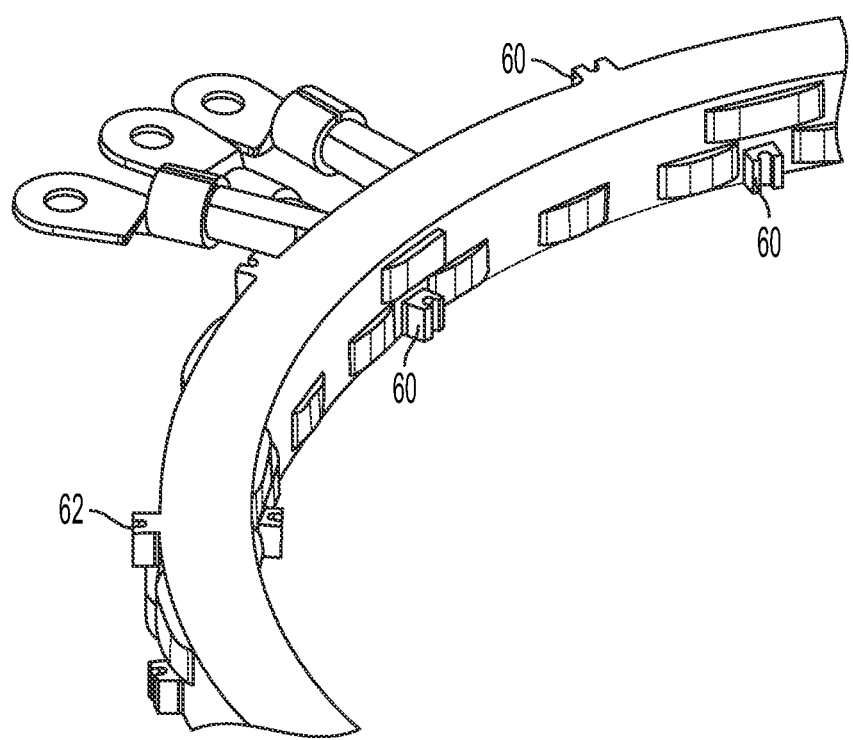
FIG. 6 is a perspective view of a busbar assembly including wire retainers.
Figure 7:
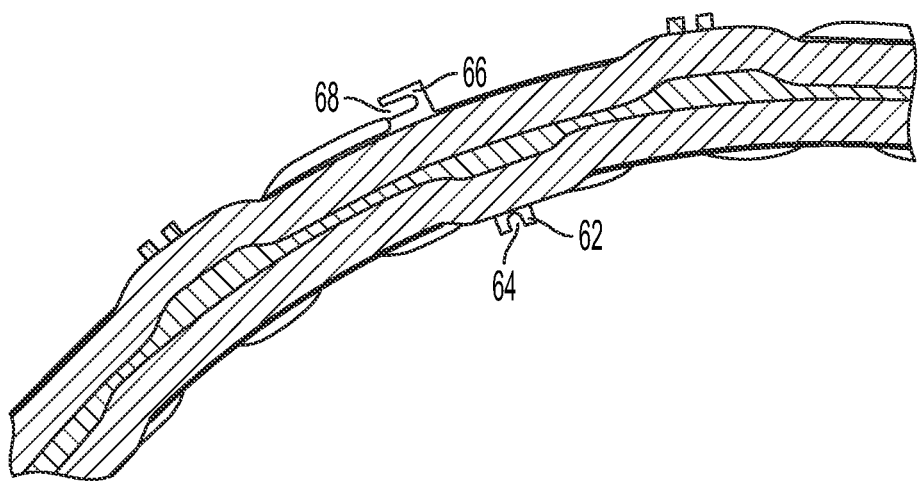
FIG. 7 is a front cross-sectional view of the busbar assembly of FIG. 6.
Figure 8:
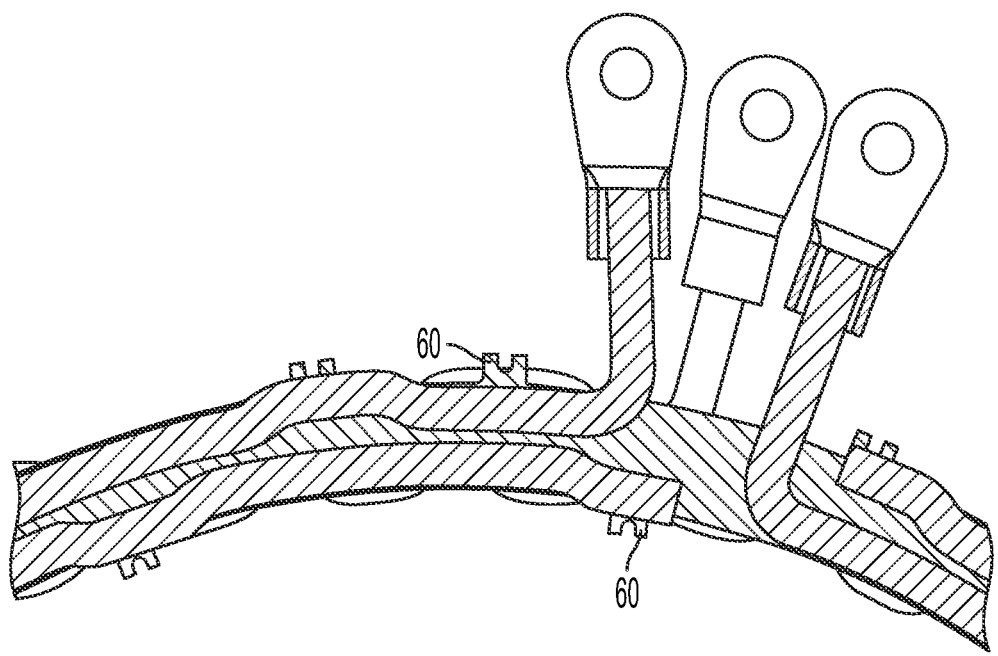
FIG. 8 is another front cross-sectional view of the busbar assembly of FIG. 6 in a region different than the region shown in FIG. 7.

As shown in FIG. 5, the first conductor 20 and the second conductor 30 are arranged in a first axial plane P1 that extends perpendicular to an axis (X) of the carrier 12 and the third conductor 40 and the neutral conductor 50 are arranged in a second axial plane P2 that extends perpendicular to the axis (X) of the carrier 12. In other words, a first set of conductors (i.e. the first conductor 20 and the second conductor 30) are stacked on top of each other in a radial direction, and a second set of conductors (i.e. the third conductor 40 and the neutral conductor 50) are axially spaced away or offset from the first set of conductors and are stacked on top of each other in the radial direction.

The first phase conductor 20, the second phase conductor 30, the third phase conductor 40, and the neutral conductor 50 each define a predetermined quantity of electrical contact sites 22, 32, 42, 52. In one aspect, the predetermined quantity of electrical contact sites 52 of the neutral conductor 50 is greater than any one of the predetermined quantities of electrical contact sites of the first phase conductor 20, the second phase conductor 30, or third phase conductor 40. One of ordinary skill in the art would recognize that the quantity of electrical contact sites 22, 32, 42, 52 can vary. In another aspect, the quantity of neutral contact sites 52 can equal a sum of all of the quantities of contact sites 22, 32, 42 for the other phase conductors.

In one aspect, the neutral conductor 50 is arranged such that the contacts 52 of the neutral conductor 50 are defined on a radially inner surface 14 of the carrier 12. This configuration can be modified such that the neutral conductor contacts 52 are defined on a radially outer surface 16 of the carrier 12.

Figure 2:
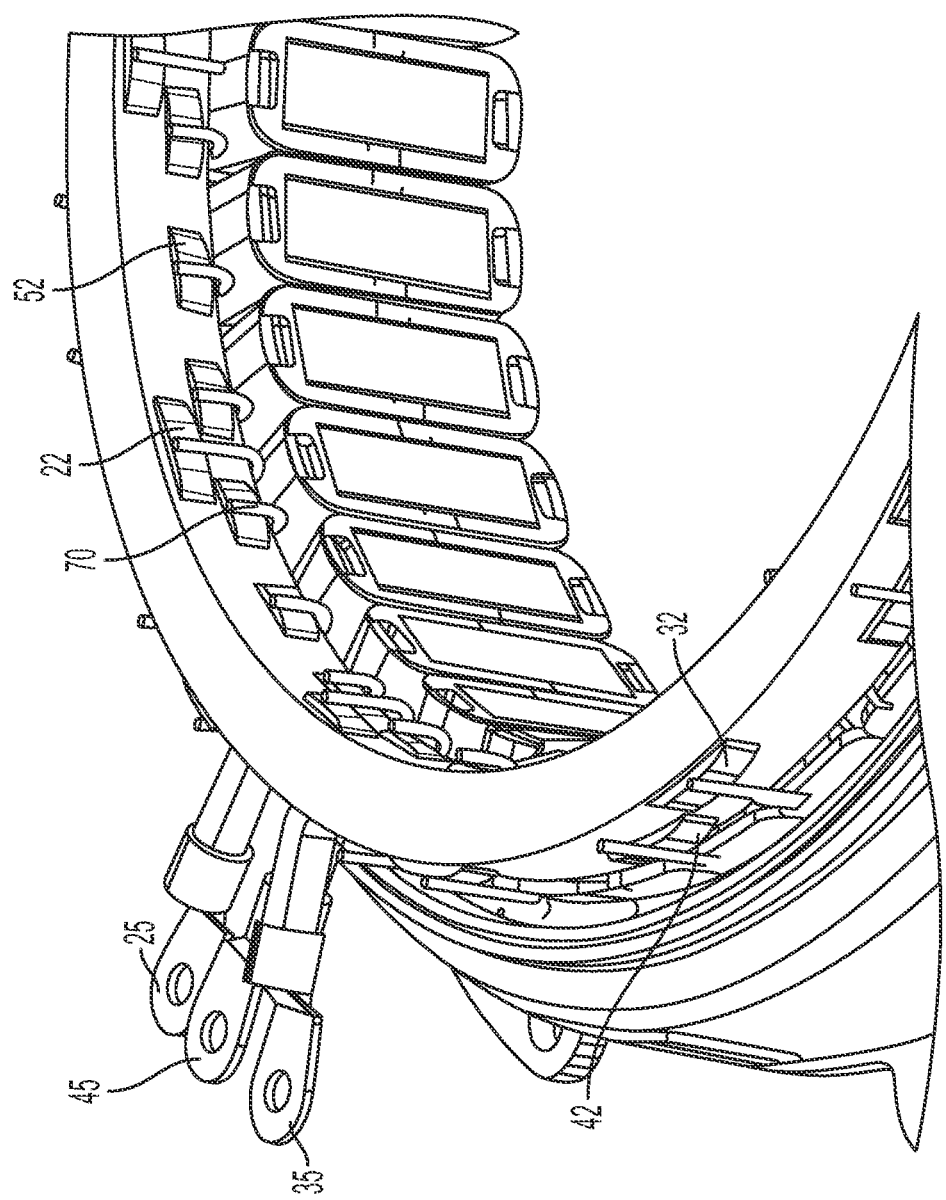
FIG. 2 illustrates the busbar assembly of FIG. 1 implemented with a stator assembly.
Figure 3:
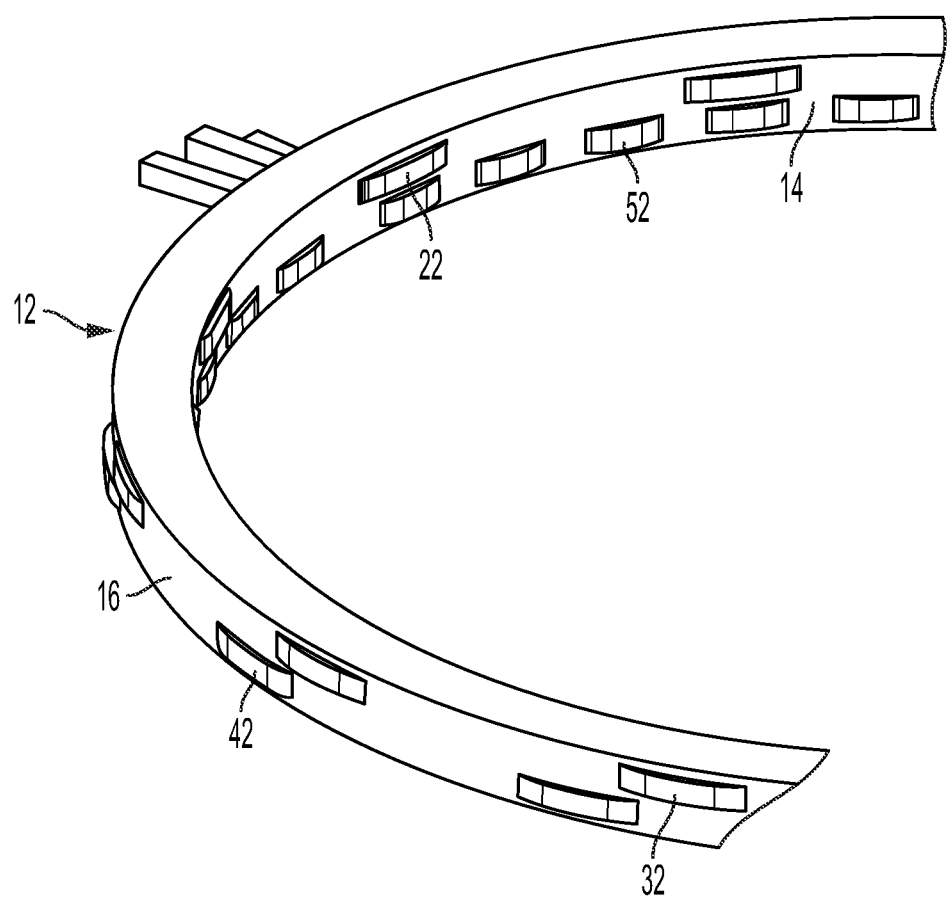
FIG. 3 is a perspective view of a busbar assembly of FIG. 1.
Figure 9:
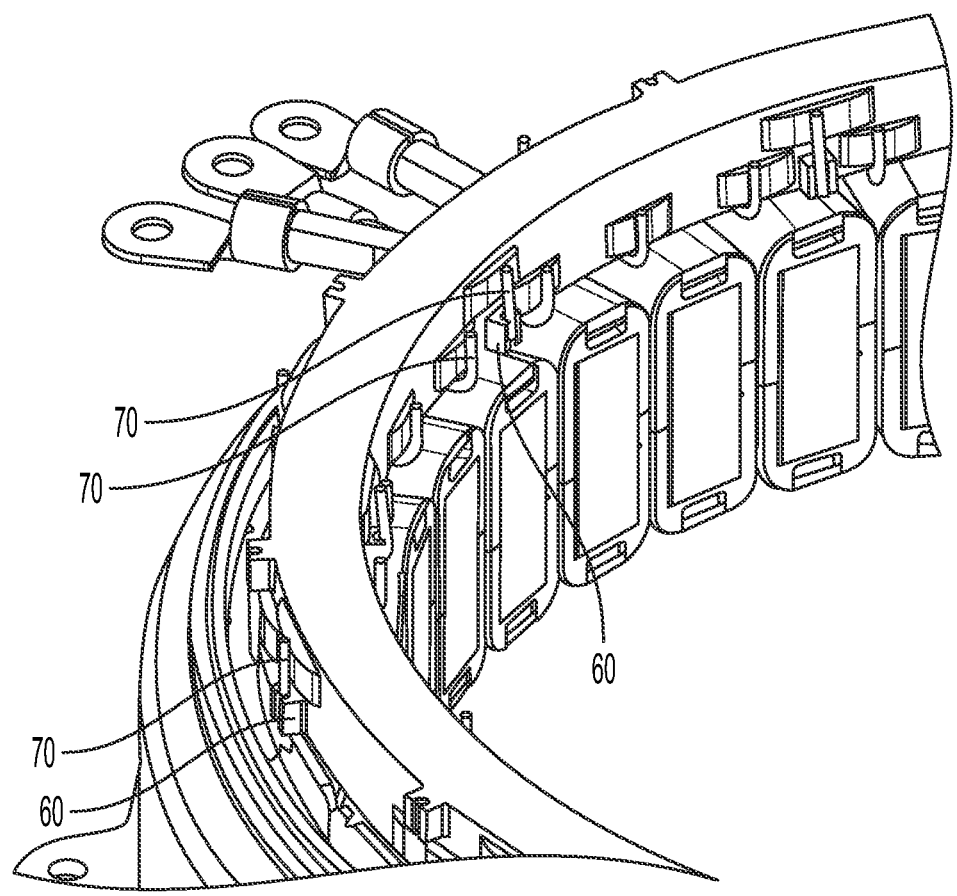
FIG. 9 illustrates the busbar assembly of FIG. 6 implemented with a stator assembly.

A stator assembly is generally shown in FIGS. 2 and 9, and illustrates wires or windings 70 configured to engage with the electrical contact sites 22, 32, 42, 52 of the conductors 20, 30, 40, 50. In a fully assembled state, the wires 70 are connected to the electrical contact sites 22, 32, 42, 52 of the conductors 20, 30, 40, 50. For example, the connections between these elements can be provided by laser welding, silver soldering, resistance welding, or any other form of connection.

Each of the conductors 20, 30, 40, 50 has a predetermined thickness (t), and the carrier 12 has an overall axial thickness ($T_A$) defined between a third axial plane (P3) and a fourth axial plane (P4), as shown in FIG. 5. An entirety of the busbar assembly 10 is axially constrained between the third axial plane (P3) and the fourth axial plane (P4).

The conductor thickness (t) is less than 40% of the overall axial thickness ($T_A$) of the conductor 12 in one embodiment. In another aspect, the conductor thickness (t) is 25%-45% of the overall axial thickness ($T_A$) of the conductor 12. In one aspect, the thickness (t) of the conductor is a function of the application and current requirements, as well as any manufacturing requirements.

Based on the conductors 20, 30, 40, 50 having a square profile (at least in regions away from the contacts), the thickness (t) of the conductors 20, 30, 40, 50 is the same in the radial and axial direction. As shown in FIG. 5, an overall radial thickness ($T_R$) is also predefined for the carrier 12, and the conductor thickness (t) is less than 40% of the overall radial thickness ($T_R$) in one embodiment. In another aspect, the conductor thickness (t) is 25%-45% of the overall radial thickness ($T_R$). In one aspect, thicknesses ($T_A$) and ($T_R$) are a function of the thickness (t) and the electrical insulation requirements.

One of ordinary skill in the art would understand that the dimensions of the carrier 12 and the conductors 20, 30, 40, 50 can vary. The present disclosure generally provides an axially and radially compact configuration for the busbar assembly 10.

As shown in FIG. 2, ends 24, 34, 44 of the first, second, and third conductors 20, 30, 40 can include a terminal 25, 35, 45. The ends 24, 34, 44 of the first, second, and third conductors 20, 30, 40 extend in an entirely radial direction and radially outward from the carrier 12. In one aspect, the terminals can be created or formed from the conductor itself. In other words, a separate terminal component or element may not be required.

As shown in FIGS. 6-9, the carrier can include a plurality of retainers 60 each configured or dimensioned to hold the electrical wires 70 in place. In one aspect, the retainers are configured to hold the wires 70 in place during manufacturing or assembly. The carrier 12 in FIGS. 6-9 is otherwise identical to the carrier 12 in FIGS. 1-5. The retainers 60 can be formed in a variety of configurations and shapes, and can be located in a variety of locations along the carrier 12. In one aspect, the plurality of retainers 60 are arranged along at least one of a radially inner surface 14 or a radially outer surface 16 of the carrier 12. In one embodiment, the retainers 60 are provided on both the radially inner surface 14 and the radially outer surface 16 of the carrier 12.

In one aspect, the retainers 60 include a first set of retainers 62 defining slots 64 oriented in a radial direction, and a second set of retainers 66 defining slots 68 oriented in a circumferential direction. The specific shape, location, and quantity of the retainers 60 can vary, as one of ordinary skill in the art would understand based on the present disclosure. As shown in the drawings, the retainers 60 each circumferentially overlap with at least one of the electrical contact sites 22, 32, 42, 52. In one aspect, the retainers 60 are arranged circumferentially directly adjacent to two electrical contact sites and axially directly adjacent to another electrical contact site (as illustrated in FIG. 9). In other words, the retainers 60 can be arranged such that they are surrounded on at least three sides by electrical contact sites.

Having thus described the present disclosure in detail, it is to be appreciated and will be apparent to those skilled in the art that many physical changes, only a few of which are exemplified in the detailed description of the embodiments, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS busbar assembly 10
carrier 12
radially inner surface 14 of carrier
radially outer surface 16 of carrier
first phase conductor 20
first phase conductor electrical contact site 22
first phase conductor end 24
first phase conductor terminal 25
second phase conductor 30
second phase conductor electrical contact site 32
second phase conductor end 34
second phase conductor terminal 35
third phase conductor 40
third phase conductor electrical contact site 42
third phase conductor end 44
third phase conductor terminal 45
neutral conductor 50
neutral conductor electrical contact site 52
retainers 60
first set of retainers 62
slots 64
second set of retainers 66
slots 68
wires 70

What is claimed is:

1. A busbar assembly comprising:
   a carrier; and
   a plurality of conductors arranged within the carrier such that at least a portion of each of the plurality of conductors are exposed in a radial direction and define contact sites;
   wherein the carrier includes a plurality of retainers each dimensioned to hold an electrical wire adjacent a respective contact site.

2. The busbar assembly of claim 1, wherein the plurality of conductors includes a first phase conductor, a second phase conductor, a third phase conductor, and a neutral conductor.

3. The busbar assembly of claim 2, wherein the first phase conductor and the second phase conductor are arranged in a first axial plane that extends perpendicular to an axis of the carrier.

4. The busbar assembly of claim 3, wherein the third phase conductor and the neutral conductor are arranged in a second axial plane that extends perpendicular to the axis of the carrier, and the second axial plane is offset from the first axial plane.

5. The busbar assembly of claim 2, wherein the first phase conductor, the second phase conductor, the third phase conductor, and the neutral conductor each define a predetermined quantity of contact sites, and the predetermined quantity of contact sites of the neutral conductor is greater than any one of the predetermined quantities of contact sites of the first phase conductor, the second phase conductor, or the third phase conductor.

6. The busbar assembly of claim 2, wherein the neutral conductor is arranged such that the contact sites of the neutral conductor are defined on a radially inner surface of the carrier.

7. The busbar assembly of claim 1, wherein the carrier is formed by molding the carrier about the plurality of conductors.

8. The busbar assembly of claim 1, wherein the plurality of retainers are arranged along at least one of a radially inner surface or a radially outer surface of the carrier.

9. The busbar assembly of claim 1, wherein the plurality of retainers include a first set of retainers defining slots oriented in a radial direction and a second set of retainers defining slots oriented in a circumferential direction.

10. The busbar assembly of claim 1, wherein the plurality of conductors each have a square cross-sectional profile.

11. The busbar assembly of claim 1, wherein a first set of two conductors of the plurality of conductors are stacked on top of each other in a radial direction, and a second set of two conductors of the plurality of conductors are axially spaced away from the first set of two conductors and are stacked on top of each other in the radial direction.

12. The busbar assembly of claim 1, wherein each of the plurality of conductors have a predetermined axial thickness (t), and the carrier has an overall axial thickness (T), and the predetermined axial thickness (t) is less than 40% of the overall axial thickness (T).

13. The busbar assembly of claim 1, wherein at least one terminal end of at least three conductors of the plurality of conductors extends radially outward from the carrier.

14. A busbar assembly comprising:
    a plurality of conductors including:
       a first set of two conductors of the plurality of conductors stacked on top of each other in a radial direction, and a second set of two conductors of the plurality of conductors axially spaced away from the first set of two conductors and stacked on top of each other in the radial direction; and
    a carrier molded around the plurality of conductors such that portions of the plurality of conductors are exposed to define electrical contact sites on a radially inner surface of the carrier and a radially outer surface of the carrier;
    wherein the carrier includes a plurality of retainers each dimensioned to retain an electrical wire adjacent a respective contact site.

15. The busbar assembly of claim 14, wherein the plurality of conductors each have a square cross-sectional profile.

16. The busbar assembly of claim 14, wherein the plurality of retainers are arranged along at least one of a radially inner surface or a radially outer surface of the carrier.

17. The busbar assembly of claim 14, wherein each retainer of the plurality of retainers circumferentially overlaps with at least one contact site of the plurality of conductors.

18. The busbar assembly of claim 14, wherein at least one terminal end of at least three conductors of the plurality of conductors extends radially outward from the carrier.

* * * * *